(12) United States Patent
Svedberg et al.

(10) Patent No.: US 7,192,989 B2
(45) Date of Patent: Mar. 20, 2007

(54) METHOD AND EXPANSION DEVICE FOR PREPARING EXPANDED THERMOPLASTIC MICROSPHERES

(75) Inventors: Lars-Olof Svedberg, Kvissleby (SE); Guy Hovland, Njurunda (SE); Thomas Holmlund, Sundsvall (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/736,611

(22) Filed: Dec. 17, 2003

(65) Prior Publication Data

US 2004/0176487 A1 Sep. 9, 2004

(51) Int. Cl.
C08J 9/16 (2006.01)
C08J 9/00 (2006.01)
B29C 44/34 (2006.01)

(52) U.S. Cl. .......... 521/60; 422/133; 422/135; 422/210; 422/212; 422/224; 422/309; 366/278

(58) Field of Classification Search ............ 521/60; 422/133, 135, 210, 212, 224, 309; 34/179; 366/278

See application file for complete search history.

(56) References Cited

U.S. PATENT DOCUMENTS

| 3,615,972 A | 10/1971 | Morehouse | 156/79 |
| 3,804,378 A | 4/1974 | Walls | 259/7 |
| 3,808,701 A | 5/1974 | Bachmann | 34/179 |
| 4,379,106 A | 4/1983 | Bussey | 264/51 |
| 4,722,943 A | 2/1988 | Melber | 521/57 |
| 4,958,933 A * | 9/1990 | Zakich | 366/81 |
| 5,228,775 A | 7/1993 | Horn | 366/278 |
| 5,342,689 A | 8/1994 | Melber | 428/402.22 |
| 6,099,288 A * | 8/2000 | Long | 425/208 |

FOREIGN PATENT DOCUMENTS

| EP | 0486080 A2 | 5/1992 |
| EP | 0566367 A2 | 4/1993 |
| EP | 1067151 A1 | 1/2001 |
| FR | 2699089 | 6/1994 |
| WO | 92/20465 | 11/1992 |

OTHER PUBLICATIONS

Patent Abstracts of Japan, Abstract of JP 55137928, Publication Date Oct. 28, 1980.
English language abstract XP-002239101 of SE 8703979, Apr. 14, 1989.
English language abstract of WO 94/13383, the equivalent of FR 2699089.

* cited by examiner

Primary Examiner—Irina S. Zemel
(74) Attorney, Agent, or Firm—WRB-IP LLP

(57) ABSTRACT

The present invention relates to a method of preparing expanded thermoplastic microspheres, comprising charging thermally expandable microspheres into an expansion device comprising rotating feeding means enveloped by a hollow body, and one or more scrapers. The invention further relates to an expansion device for expanding thermoplastic microspheres.

20 Claims, 2 Drawing Sheets

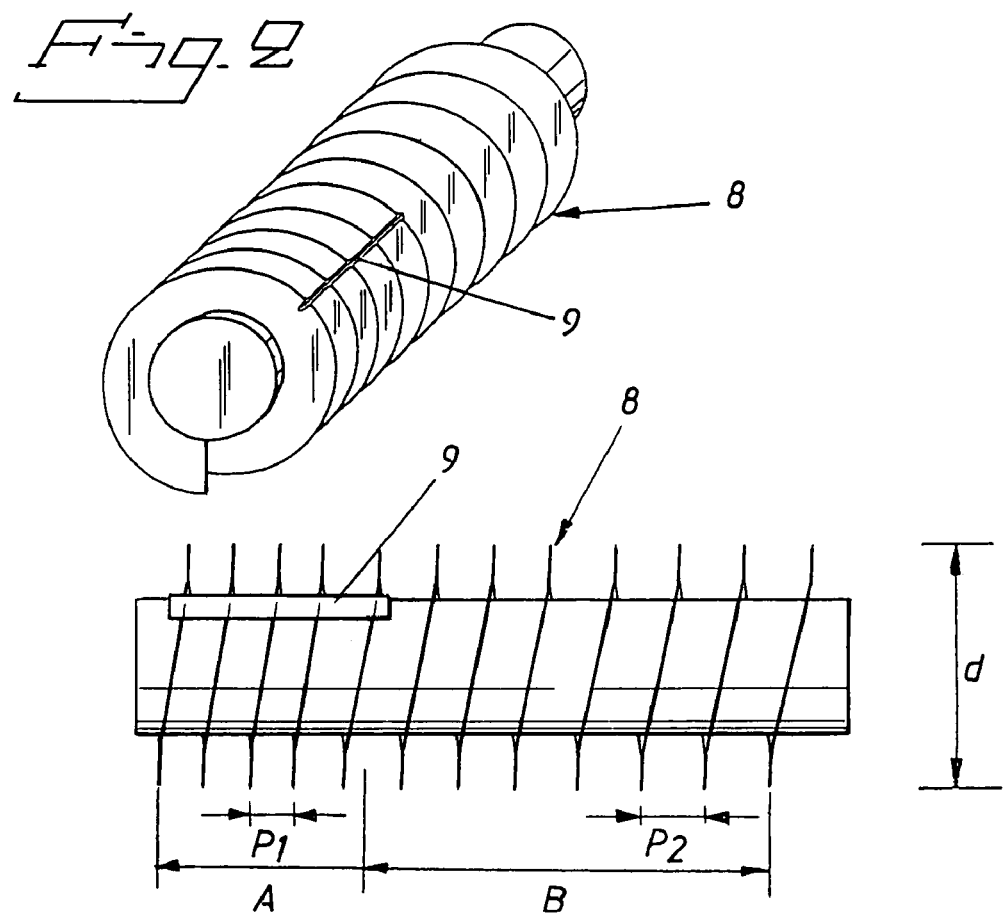
Fig. 2
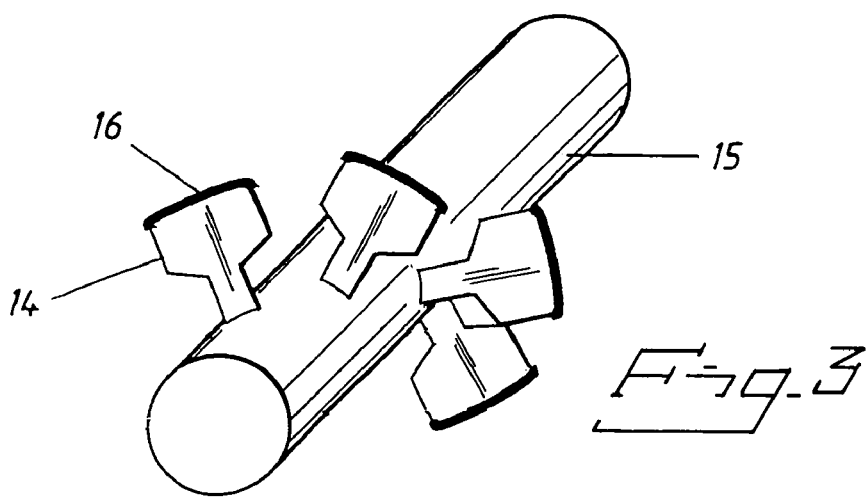
Fig. 3
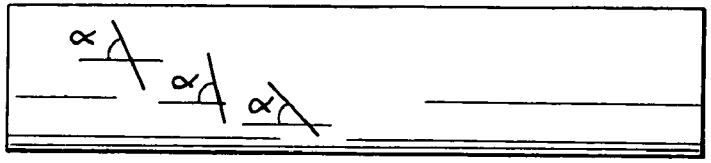

METHOD AND EXPANSION DEVICE FOR PREPARING EXPANDED THERMOPLASTIC MICROSPHERES

The present invention relates to a method and an expansion device for preparing expanded thermoplastic microspheres.

Thermally expandable microspheres are known in the art and described in detail in, for example, U.S. Pat. No. 3,615,972, EP 486080, EP 566367 and EP 1 067 151, which documents hereby are incorporated by reference. In such microspheres, a propellant is encapsulated within a thermoplastic shell. Upon heating, the propellant evaporates to increase the internal pressure, at the same time as the shell softens, resulting in significant expansion of the microspheres, normally from about 2 to about 5 times their diameter.

Thermoplastic microspheres can be used in various applications as unexpanded or pre-expanded. Examples of applications for expanded microspheres are solvent based resins, like polyester, for dry spheres, and water based application systems, like paint, for wet spheres.

Full expansion of thermoplastic microspheres may lead to problems with agglomeration due to the higher temperature needed for full expansion, in combination with the thin thermoplastic shell which results from the expansion. There is a need for providing a method and an expansion device for preparing expanded thermoplastic microspheres, where the degree of expansion can be controlled in order to have the possibility to provide different densities of expanded microspheres. There is also a need for a method and an expansion device for expanding thermoplastic microspheres, which is simple and requires small space, which is comparatively inexpensive, and which is easily used by the end-users, at the place where expanded microspheres are to be used, thereby saving transport volumes and costs.

EP 0 348 372 discloses a process for preparation of expanded thermoplastic microspheres where the expansion takes place on a conveyor belt. The process works well but takes up considerable space and is comparatively expensive.

U.S. Pat. No. 4,722,943 and U.S. Pat. No. 5,342,689 describe methods for expanding microspheres where microspheres are mixed with a surface barrier coating to prevent agglomeration during a drying step. However, the amount of processing aid, such as talc, is very high which affects the possibilities of fast cooling. This causes difficulties in controlling the degree of expansion of the microspheres.

It is an object of the present invention to provide a method of preparing expanded thermoplastic microspheres, which can be made in small equipment, which gives minimum of dust problems, which gives minimum of agglomeration, where the degree of expansion of the microspheres can be more easily controlled than before, and which also gives a possibility to continuously producing a product of expanded microspheres having a narrow density distribution. It is a further object of the present invention to provide an expansion device for preparing expanded thermoplastic microspheres, suitable for the above-mentioned method.

According to the invention it has surprisingly been found to achieve the above mentioned objects by a method and an expansion device for preparing expanded thermoplastic microspheres. The method, according to the invention, comprises charging thermally expandable microspheres into an expansion device comprising rotating feeding means enveloped by a hollow body, and one or more scrapers, wherein the scrapers prevent layers of microspheres being built-up in the expansion device, transporting the microspheres through the expansion device while increasing the temperature of the microspheres to achieve expansion thereof, and discharging the microspheres. The one or more scrapers are suitably positioned between the outer radius of the feeding means and the inner surface of the hollow body. The resulting feeding direction in the expansion device is suitably substantially perpendicular to the rotational movement of the feeding means.

The invention further concerns an expansion device for preparing expanded thermoplastic microspheres, comprising rotatable feeding means enveloped by a hollow body, and one or more scrapers positioned between the outer radius of the feeding means and the inner surface of the hollow body.

The method and the expansion device allow for a continuous production of expanded thermoplastic microspheres.

The one or more scrapers, or a surface layer of the one or more scrapers, are/is suitably made of a polymeric material, preferably a heat-resistant polymeric material. The polymeric material is preferably a fluoroplastic material, such as PTFE, PVDF, PFA or FEP. If the polymeric material is a thermoplastic, the melting point of the polymeric material is suitably above about 200° C., preferably above 250° C.

Preferably, the one or more scrapers are at least partly in contact with the inner surface of the hollow body. The one or more scrapers suitably have certain flexibility so that the one or more scrapers, when pressed against the inner surface of the hollow body, will provide a tight contact between the one or more scrapers and the inner surface of the hollow body.

The hollow body is suitably provided with one or more heaters. The heaters are suitably jacket heaters. The feeding means itself is also suitably provided with one or more heaters.

The thermally expandable microspheres are suitably transported to the inlet of the expansion device by using a screw feeder, which can be provided with heaters.

The thermally expandable microspheres are suitably premixed, before entering the expansion device, with a filler preventing agglomeration of the microspheres. The filler is suitably in the form of fine particles having a particle diameter range from about $1 \cdot 10^{-9}$ to about $1 \cdot 10^{-3}$ m, preferably from about $1 \cdot 10^{-8}$ to about $3 \cdot 10^{-5}$ m. Examples of fillers are inorganic compounds such as: aluminium powder, magnesium carbonate, magnesium phosphates, magnesium hydroxide, dolomite, calcium carbonate, calcium phosphates, calcium sulphate, talc, kaolin, silicon oxides, iron oxides, titanium oxide, aluminium oxides and hydroxides, zinc oxide, hydrotalcite, mica, barytes, glass spheres, fly ash, fine sand, mineral fibres and generally reinforcing fibres, wollastonite, feldspars, diatomaceous earth, pearlites, vermicullites, hollow quartz and ceramic spheres. Also organic compounds may be used, especially polymers with a sufficient high softening temperature, and cellulose, wood flour, carbon black, carbon fibres and graphite fibres. Preferably, the filler is a silicon oxide such as silicon dioxide. The filler may be used in its pure form or it may be surface treated in different ways in order to increase the agglomerate preventing effect. One way of surface treating the filler is to make it hydrophobic. The weight ratio added filler to microspheres is depending on which filler is used, but is suitably from about 1:1000 to about 5:1, preferably from about 1:500 to about 1:1, even more preferably from about 1:100 to about 1:3, and most preferably from about 1:25 to about 1:5.

The method and the expansion device according to the invention can be used for all known kinds of expandable thermoplastic microspheres, such as those marketed under the trademark Expancel®. Suitable microspheres may have a thermoplastic shell made from polymers or co-polymers obtainable by polymerizing various ethylenically unsaturated monomers which can be nitrile containing monomers such as acrylo nitrile, methacrylo nitrile, α-chloroacrylo nitrile, α-ethoxyacrylo nitrile, fumaro nitrile, croto nitrile, acrylic esters such as methylacrylate or ethyl acrylate, methacrylic esters such as methyl methacrylate, isobornyl methacrylate or ethyl methacrylate, vinyl halides such as vinyl chloride, vinylidene halides such as vinylidene chloride, vinyl pyridine, vinyl esters such as vinyl acetate, styrenes such as styrene, halogenated styrenes or α-methyl styrene, or dienes such as butadiene, isoprene and chloroprene. Any mixtures of the above mentioned monomers may also be used. It may sometimes be desirable that the monomers for the polymer shell also comprise crosslinking multifunctional monomers, such as one or more of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth) acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth) acrylate, pentaerythritol hexa(meth)acrylate, dimethylol tricyclodecane di(meth)acrylate, triallylformal tri(meth) acrylate, allyl methacrylate, trimethylol propane tri(meth) acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal or triallyl isocyanate, triallyl isocyanurate etc. If present, such crosslinking monomers preferably constitute from about 0.1 to about 1 wt %, most preferably from about 0.2 to about 0.5 wt % of the total amounts of monomers for the polymer shell. Preferably the polymer shell constitutes from about 60 to about 95 wt %, most preferably from about 75 to about 85 wt % of the total microsphere.

The propellant in a microsphere is normally a liquid having a boiling temperature not higher than the softening temperature of the thermoplastic polymer shell. The propellant, also called the blowing agent or foaming agent, can be hydrocarbons such as n-pentane, isopentane, neopentane, butane, isobutane, hexane, isohexane, neohexane, heptane, isoheptane, octane and isooctane, or mixtures thereof. Also, other hydrocarbon types can also be used, such as petroleum ether, and chlorinated or fluorinated hydrocarbons, such as methyl chloride, methylene chloride, dichloro ethane, dichloro ethylene, trichloro ethane, trichloro ethylene, trichlorofluoro methane etc. The propellant suitably makes up from about 5 to about 40 weight % of the microsphere.

The temperature at which the expansion of the microspheres starts is called $T_{start}$, while the temperature at which maximum expansion is reached is called $T_{max}$, both determined at a temperature increase rate of 20° C. per minute. The thermally expandable microspheres used in the present invention suitably have a $T_{start}$ of from about 20 to about 200° C., preferably from about 40 to about 180° C., most preferably from about 60 to about 150° C. The thermally expandable microspheres used in the present invention suitably have a $T_{max}$ of from about 50 to about 300° C., preferably from about 100 to about 250° C., most preferably from about 140 to about 200° C.

The volume weighted average particle size of the thermally expandable microspheres, according to the invention, is suitably from about 1 to about 500 μm, preferably from about 3 to about 100 μm, most preferably from about 5 to about 50 μm. By heating to a temperature above $T_{start}$, it is normally possible to expand the microspheres from about 2 to about 7 times, preferably from about 4 to about 7 times, their diameter.

The density of the microspheres discharged is controlled by choosing a suitable heating temperature and/or length of time during which the microspheres are present in the expansion device. The temperature in the expansion device is suitably above $T_{start}$, preferably 5 to 150° C. above $T_{start}$, most preferably 20 to 50° C. above $T_{start}$. The average residence time of the microspheres in the expansion device is from about 5 to about 200 s, preferably from about 10 to about 100 s, most preferably from about 30 to about 90 s.

Both wet and dry thermally expandable microspheres can be used in the method according to the invention. However, the method according to the invention is especially suitable for thermally expandable microspheres having a low wet content. Suitably, the thermally expandable microspheres have a dry solids content of more than about 50 weight %, preferably more than about 80 weight %, most preferably more than about 97 weight %.

The rate of rotation of the feeding means is suitably from about 1 to about 100 r.p.m., preferably from about 5 to about 90 r.p.m., most preferably from about 40 to about 80 r.p.m.

The one or more scrapers are suitably mounted on the feeding means and suitably extend radially beyond the outer radius of the feeding means towards the inner surface of the hollow body. Furthermore, the one or more scrapers suitably extend longitudinally in the feeding direction. The one or more scrapers are suitably mounted so that the scrapers, alone, or in combination, effect a scraping of from about 1 to about 100% of the longitudinal length of the inner surface of the hollow body, preferably from about 10 to about 100%, most preferably from about 20 to about 95%. The scrapers can be of different individual length. For example, there may be a combination of one or more long scrapers and one or more short scrapers. Preferably, one or two scrapers effecting a scraping of from about 70 to about 100% of the longitudinal length of the inner surface of the hollow body is used together with 1 to 5, preferably 2 to 4, scrapers effecting a scraping of from about 10 to about 40% of the longitudinal length of the inner surface of the hollow body. If too many long scrapers are used, there is a risk of clogging of microspheres within the screw, especially if the screw pitch is low. Suitably, the length of the scrapers are adjusted to be the most suitable depending on other process parameters such as dimension of the expansion device, rate of rotation, microsphere type, filler content etc.

In some cases, for example at weight ratios of added filler to microspheres of from about 1:100 to about 1:10, the scrapers effect a scraping of from about 20 to about 60% of the longitudinal length of the inner surface of the hollow body. In other cases, for example at weight ratios of added filler to microspheres of from about 1:10 to about 1:3, the scrapers effect a scraping of from about 50 to about 100% of the longitudinal length of the inner surface of the hollow body.

The number of scrapers mounted on the feeding means is suitably from 1 to 6, preferably from 2 to 4.

The scraping movement can be made at any part of the inner surface of the hollow body. Suitably, the one or more scrapers are mounted on the feeding means starting at the inlet side of the expansion device, i.e. where the unexpanded microspheres are added, and extending therefrom.

In a preferred embodiment of the present invention, the feeding means is in the form of a screw. The screw has suitably a pitch to diameter ratio of from about 0.05 to about 1.5, preferably from about 0.15 to about 0.5. The pitch of the screw is suitably lower at the beginning of the screw, i.e. near the inlet, than at the end of the screw. The pitch can be gradually increasing along the screw. Alternatively, the pitch can be increasing in discrete steps, so that one portion of the screw has a different pitch than another portion of the screw.

In another preferred embodiment of the invention, the feeding means is in the form of one or more paddles, suitably protruding from a central core. The paddles are suitably arranged so that their projected angle ($\alpha$) against the feeding direction is $0°<\alpha<90°$, preferably from about 10° to about 60°.

By the method and an expansion device according to the invention, an easier way of expanding thermally expandable microspheres is provided requiring small equipment and reducing transport costs of expanded microspheres. The degree of expansion of the microspheres can also be more easily controlled than before.

BRIEF DESCRIPTION OF THE DRAWINGS

FIG. 2 shows feeding means being of a screw-type, and

FIG. 3 shows feeding means being of a paddle-type.

DETAILED DESCRIPTION OF THE DRAWINGS

Figure 1:
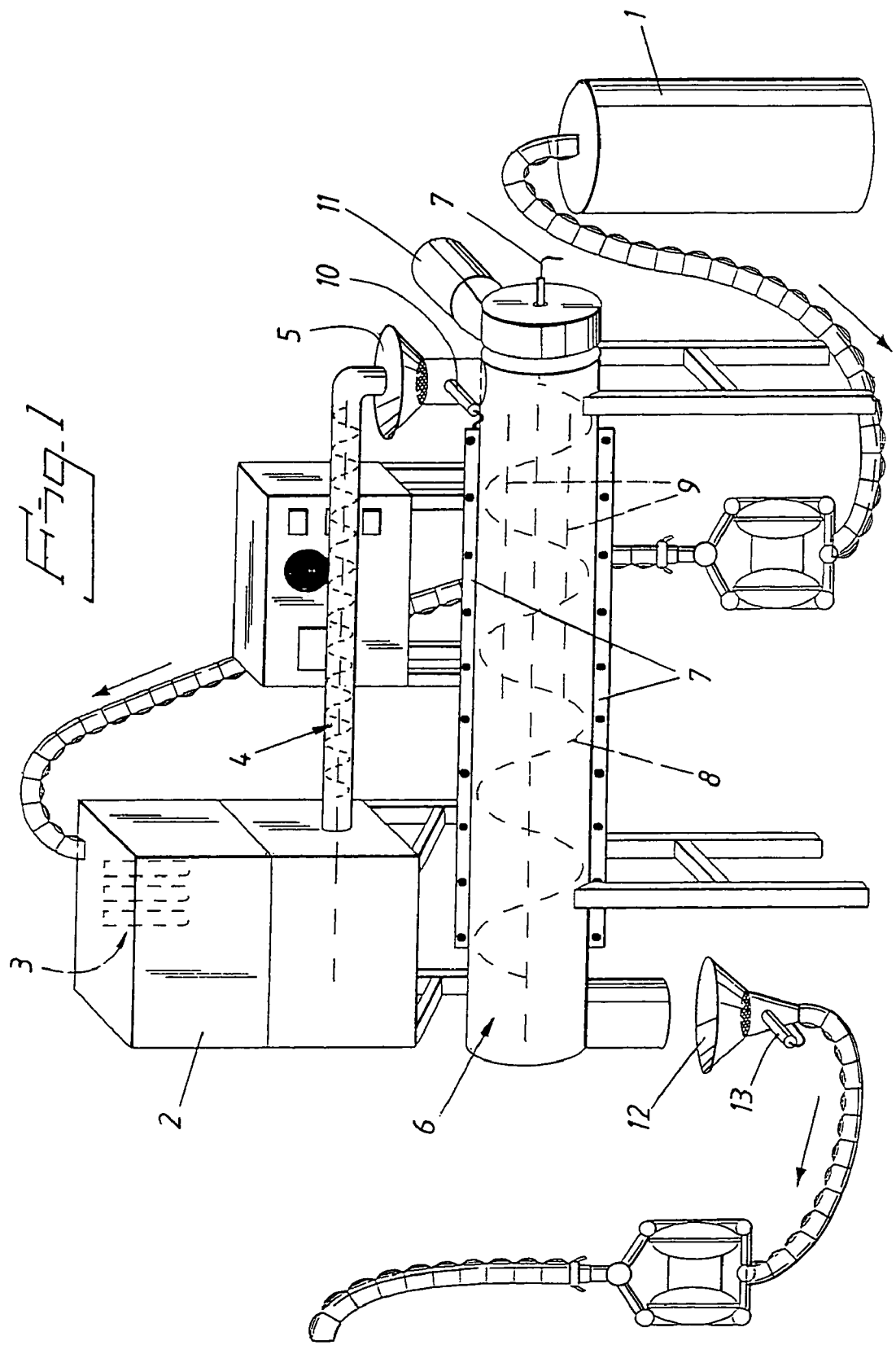
FIG. 1 shows an embodiment of the present invention wherein the feeding means is a screw.

FIG. 1 shows an embodiment of the method where the unexpanded thermoplastic microspheres are pumped from a storage tank 1 into a silo 2 and filtered through a filter 3. Thereafter, the microspheres are being fed into a first screw feeder 4 and transported to an inlet 5 of an expansion device 6 comprising heating means 7, and a screw 8 with mounted scrapers 9. The inlet 5 is provided with a vibrator 10 and the screw is suitably connected to a motor 11. Expanded microspheres are suitably discharged through an outlet 12, provided with a vibrator 13, and suitably pumped away.

FIG. 2 shows the screw 8 with a mounted scraper 9, and having the diameter d. One portion A of the screw has a pitch $p_1$ and another portion B of the screw has a different pitch $P_2$.

FIG. 3 shows an embodiment of the feeding means in the form of paddles 14 protruding from a central core 15. The paddles are provided with scrapers 16. Each paddle has an angle $\alpha$ against the feeding direction. Different paddles may have different angles $\alpha$. The feeding means described in FIG. 3 can substitute the screw in FIG. 1.

The benefits of the present invention will now further be described in connection with the following examples which, however, should not be interpreted as limiting the scope of the invention.

EXAMPLES

Example 1

An expansion device comprising a hollow body according to the present invention having a screw as feeding means is used for expanding thermoplastic expandable microspheres. The screw is 2200 mm long and its diameter 205 mm. The screw is divided into three sections of equal length each having a different screw pitch which is 40, 50 and 60 mm, starting at the inlet. The screw has 4 scrapers mounted of which one has a length corresponding to 90% of the length of the inner surface of the hollow body, and the three other scrapers each have a length corresponding to 25% of the same. The rotational speed of the screw is 54 r.p.m. Microspheres of the type Expancel® 461 DU having a volume weighted average particle size of 12 μm, having $T_{start}$=99° C. and $T_{max}$=140° C., is pre-mixed with hydrophobic silicon dioxide in a relation 85 parts by weight microspheres and 15 parts by weight silicon dioxide. Then the microsphere-mixture is charged into the expansion device. The residence time of the microspheres in the expansion device is 60 s.

14 kg/h of expanded microspheres of even density can be discharged. There is no significant agglomeration of microspheres in the screw.

The invention of claimed is:

1. A method of preparing expanded thermoplastic microspheres, comprising the steps of:
   (a) charging thermally expandable microspheres into an expansion device comprising rotating feeding means enveloped by a hollow body, and one or more scrapers preventing layers of microspheres being built-up in the expansion device,
   (b) transporting the microspheres through the expansion device while increasing the temperature of the microspheres to achieve expansion thereof, and,
   (c) discharging the microspheres.

2. A method according to claim 1, wherein said one or more scrapers are positioned between the outer radius of the feeding means and the inner surface of the hollow body.

3. A method according the claim 1, wherein said one or more scrapers are mounted on the feeding means and extend radially beyond the outer radius of the feeding means towards the inner surface of the hollow body.

4. A method according to claim 1, wherein said one or more scrapers, alone, or in combination, effect a scraping of from about 20 to about 95% of the longitudinal length of the inner surface of the hollow body.

5. A method according to claim 1, wherein one or two scrapers effects a scraping of from about 70 to about 100% of the longitudinal length of the inner surface of the hollow body and 2 to 4 scrapers effect a scraping of from about 10 to about 40% of the longitudinal length of the inner surface of the hollow body.

6. A method according to claim 1, wherein said one or more scrapers are mounted on the feeding means starting at the inlet side of the expansion device and extending therefrom.

7. A method according to claim 1, wherein said one or more scrapers, or a surface layer of said one or more scrapers, are/is made of a fluoroplastic material.

8. A method according to claim 1, wherein the hollow body is provided with one or more heaters.

9. A method according to claim 1, wherein the thermally expandable microspheres axe pre-mixed, before entering the expansion device, with a filler preventing agglomeration of the microspheres.

10. A method according to claim 9, wherein the filler is silicon dioxide.

11. A method according to claim 10, wherein the weight ratio added filler to microspheres is from about 1:100 to about 1:3.

12. A method according to claim 1, wherein the thermally expandable microspheres have a dry solids content of more than about 97 weight %.

13. A method according to claim 1, wherein the feeding means is in the form of a screw.

14. A method according to claim 1, wherein the feeding means is in the form of one or more paddles protruding from a central core.

15. A method of preparing expanded thermoplastic microspheres, comprising the steps of:

(a) pro-mixing thermally expandable microspheres with a filler preventing agglomeration of the microspheres,
(b) charging the microspheres into an expansion device comprising rotating feeding means enveloped by a hollow body, and one or more scrapers preventing layers of microspheres being built-up in the expansion device, said one or more scrapers, alone, or in combination, effect a scraping of from about 20 to about 95% of the longitudinal length of the inner surface of the hollow body, the hollow body is provided with one or more heaters,
(b) transporting the microspheres through the expansion device while increasing the temperature of the microspheres to achieve expansion thereof, and,
(c) discharging the microspheres.

16. A method according to claim 15, wherein the feeding means is in the form of a screw.

17. A method according to claim 15, wherein the feeding means is in the form of one or more paddles protruding from a central core.

18. An expansion device for preparing expanded thermoplastic microspheres comprising rotatable feeding means enveloped by a hollow body, and one or more scrapers positioned between the outer radius of the feeding means and the inner surface of the hollow body, said scrapers being mounted on the feeding means and extending radially beyond the outer radius of the feeding means towards the inner surface of the hollow body, and
wherein one or two scrapers effects a scraping of from about 70 to about 100% of the longitudinal length of the inner surface of the hollow body and 2 to 4 scrapers effect a scraping of from about 10 to about 40% of the longitudinal length of the inner surface of the hollow body.

19. An expansion device for preparing expanded thermoplastic microspheres comprising rotatable feeding means enveloped by a hollow body, and one or more scrapers positioned between the outer radius of the feeding means and the inner surface of the hollow body, said scrapers being mounted on the feeding means and extending radially beyond the outer radius of the feeding means towards the inner surface of the hollow body, and
wherein the hollow body is provided with one or more heaters.

20. An expansion device for preparing expanded thermoplastic microspheres comprising rotatable feeding means enveloped by a hollow body, and one or more scrapers positioned between the outer radius of the feeding means and the inner surface of the hollow body, said scrapers being mounted on the feeding means and extending radially beyond the outer radius of the feeding means towards the inner surface of the hollow body, and
wherein the feeding means is provided with one or more heaters.

* * * * *